(12) United States Patent
Steeves et al.

(10) Patent No.: US 11,514,702 B2
(45) Date of Patent: Nov. 29, 2022

(54) SYSTEMS AND METHODS FOR PROCESSING IMAGES

(71) Applicant: ELEMENT AI INC., Montreal (CA)

(72) Inventors: Patrick Steeves, Montreal (CA); Ying Zhang, Montreal (CA)

(73) Assignee: SERVICENOW CANADA INC., Montreal (CA)

( * ) Notice: Subject to any disclaimer, the term of this patent is extended or adjusted under 35 U.S.C. 154(b) by 12 days.

(21) Appl. No.: 16/778,324

(22) Filed: Jan. 31, 2020

(65) Prior Publication Data
US 2021/0240978 A1  Aug. 5, 2021

(51) Int. Cl.
G06V 30/418 (2022.01)
G06K 9/62 (2022.01)
G06T 3/40 (2006.01)
G06T 7/33 (2017.01)
G06T 7/73 (2017.01)
G06V 30/413 (2022.01)
G06V 30/414 (2022.01)

(52) U.S. Cl.
CPC ......... *G06V 30/418* (2022.01); *G06K 9/6256* (2013.01); *G06T 3/40* (2013.01); *G06T 7/337* (2017.01); *G06T 7/73* (2017.01); *G06V 30/413* (2022.01); *G06V 30/414* (2022.01); *G06T 2207/20081* (2013.01); *G06T 2207/20084* (2013.01); *G06T 2207/30176* (2013.01)

(58) Field of Classification Search
None
See application file for complete search history.

(56) References Cited

U.S. PATENT DOCUMENTS

| | | | |
|---|---|---|---|
| 7,106,891 B2 | 9/2006 | Wyman et al. | |
| 8,634,644 B2 | 1/2014 | Chiu et al. | |
| 9,911,213 B2 | 3/2018 | Gormish et al. | |
| 10,311,302 B2 | 6/2019 | Kottenstette et al. | |
| 2014/0029857 A1 | 1/2014 | Kompalli et al. | |
| 2015/0071549 A1* | 3/2015 | Chajed | G06K 9/3275 382/199 |

(Continued)

OTHER PUBLICATIONS

Hassaballah et al., "Image Features Detection, Description and Matching", Research Gate, Chapter, 2016, https://www.researchgate.net/publication/292995470, 36 pages.

(Continued)

*Primary Examiner* — Vikkram Bali
(74) *Attorney, Agent, or Firm* — BCF LLP

(57) ABSTRACT

Systems and methods for identifying landmarks of a document from a digital representation of the document. The method comprises accessing the digital representation of the document and operating a Machine Learning Algorithm (MLA), the MLA having been trained based on a set of training digital representations of documents associated with labels. The operating the MLA comprises down-sampling the digital representation of the document, detecting landmarks, generating fractional pixel coordinates for the detected landmarks. The method further determines the pixel coordinates of the landmarks by upscaling the fractional pixel coordinates from the second resolution to the first resolution and outputs the pixel coordinates of the landmarks.

14 Claims, 9 Drawing Sheets

(56) References Cited

U.S. PATENT DOCUMENTS

2015/0324639 A1* 11/2015 Macciola ............. H04N 1/3878
  382/112
2015/0347861 A1* 12/2015 Doepke .............. G06K 9/00449
  382/199
2019/0354818 A1    11/2019 Reisswig et al.

OTHER PUBLICATIONS

Layek et al., "Remote Distance Measurement from a Single Image by Automatic Detection and Perspective Correction", Research Gate, KSII Transactions on Internet and Information Systems, 2019, https://www.researchgate.net/publication/335992687, 25 pages.
Patrick et al., "Multiple-image super-resolution on mobile devices: an image warping approach", Gallego and Ilao EURASIP Journal on Image and Video Processing, 2017, https://jivp-eurasipjournals.springeropen.com/articles/10.1186/s13640-016-0156-z, 15 pages.
Yang, "Deep Representation Learning for Multimedia Data Analysis", Hasso Plattner Institut, https://hpi.de/fileadmin/user_upload/fachgebiete/meinel/team/Haojin/habilitationsschrift/habil_thesis_HaojinYang.pdf, 2019, 278 pages.
Office Action with regard to the counterpart CA Patent Application No. 3,070,701 dated Apr. 1, 2021.

* cited by examiner

SYSTEMS AND METHODS FOR PROCESSING IMAGES

FIELD

The present technology relates to machine-vision systems and methods for processing images, such as digital representations of documents. In particular, the present technology relates to systems and methods for identifying landmarks of images and/or matching documents with corresponding templates based on identified landmarks of an image.

BACKGROUND

Developments in machine-vision techniques have enabled automation of document processing. One such machine-vision technique is referred to as image registration and allows transformation of different images into one coordinate system which may, in turn, be relied upon to compare and/or integrate data from different images, for example, but without being limitative, in the context of matching documents with corresponding templates.

Current image registration methods typically involve computing transformations of images based on landmarks detection and matching. Known image registration methods may present certain limitations, in particular, but not only, when the image is a digital representation of a paper document comprising defects as it is often the case with scanned documents. Such defects may comprise misalignment of the document during the scanning process, dirt presents on the paper document and/or the scanner, handwritten annotations, etc. In such contexts, known image registration methods may not provide a sufficient level of accuracy resulting in inaccurate alignment or failed alignment of images. This inaccurate or failed alignment may prove to be limiting in the context of matching documents with corresponding templates.

Improvements are therefore desirable.

SUMMARY

The present technology is directed to systems and methods that facilitate, in accordance with at least one broad aspect, improved identification of image landmarks. In accordance with at least another broad aspect, the present technology is directed to systems and methods that match documents with corresponding templates based on identified landmarks.

In one broad aspect, there is provided a method of identifying landmarks of a document from a digital representation of the document, the method comprising:
  accessing the digital representation of the document, the digital representation being associated with a first resolution;
  operating a Machine Learning Algorithm (MLA), the MLA having been trained:
    based on a set of training digital representations of documents associated with labels, the labels identifying landmarks of the documents represented by the training digital representations;
    to learn a first function allowing detection of landmarks of documents represented by digital representations;
    to learn a second function allowing generation of fractional pixel coordinates for the landmarks detected by the first function;
  the operating the MLA comprising:
    down-sampling the digital representation of the document, the down-sampled digital representation of the document being associated with a second resolution, the second resolution being lower than the first resolution;
    detecting landmarks from the down sampled digital representation of the document;
    generating fractional pixel coordinates for the detected landmarks in accordance with the second resolution, the fractional pixel coordinates allowing reconstructing pixel coordinates in accordance with the first resolution;
    determining the pixel coordinates of the landmarks by upscaling the fractional pixel coordinates from the second resolution to the first resolution; and
    outputting the pixel coordinates of the landmarks.

In another broad aspect, there is provided a method of identifying a template document to be associated with a document, the method comprising:
  accessing the digital representation of the document;
  accessing a set of digital representations of template documents, each one of the digital representations of template documents comprising known landmarks;
  applying an image alignment routine to the document and the template documents;
  calculating a covariance of pixel values of the document aligned and superimposed to the at least one of the template documents; and
  determining, based on the covariance of the pixel values, whether the document is to be associated with the at least one of the template documents.

In yet another broad aspect, there is provided a method of aligning a first image with a second image, the method comprising:
  accessing the first image;
  accessing the second image comprising known landmarks;
  determining pixel coordinates of landmarks of the first image;
  determining a transformation based on the determined pixel coordinates of the landmarks of the first image and known landmarks of the second image, the transformation allowing mapping of the first image onto the second image;
  calculating a covariance of pixel values of the first image aligned and superimposed to the second image; and
  determining, based on the covariance of the pixel values, whether the first image is to be associated with the second image.

In other aspects, various implementations of the present technology provide a non-transitory computer-readable medium storing program instructions for executing one or more methods described herein, the program instructions being executable by a processor of a computer-based system.

In other aspects, various implementations of the present technology provide a computer-based system, such as, for example, but without being limitative, an electronic device comprising at least one processor and a memory storing program instructions for executing one or more methods described herein, the program instructions being executable by the at least one processor of the electronic device.

In the context of the present specification, unless expressly provided otherwise, a computer system may refer, but is not limited to, an "electronic device", a "computing device", an "operation system", a "system", a "computer-based system", a "computer system", a "network system", a "network device", a "controller unit", a "monitoring device", a "control device", a "server", and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (e.g., CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Additional and/or alternative features, aspects and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
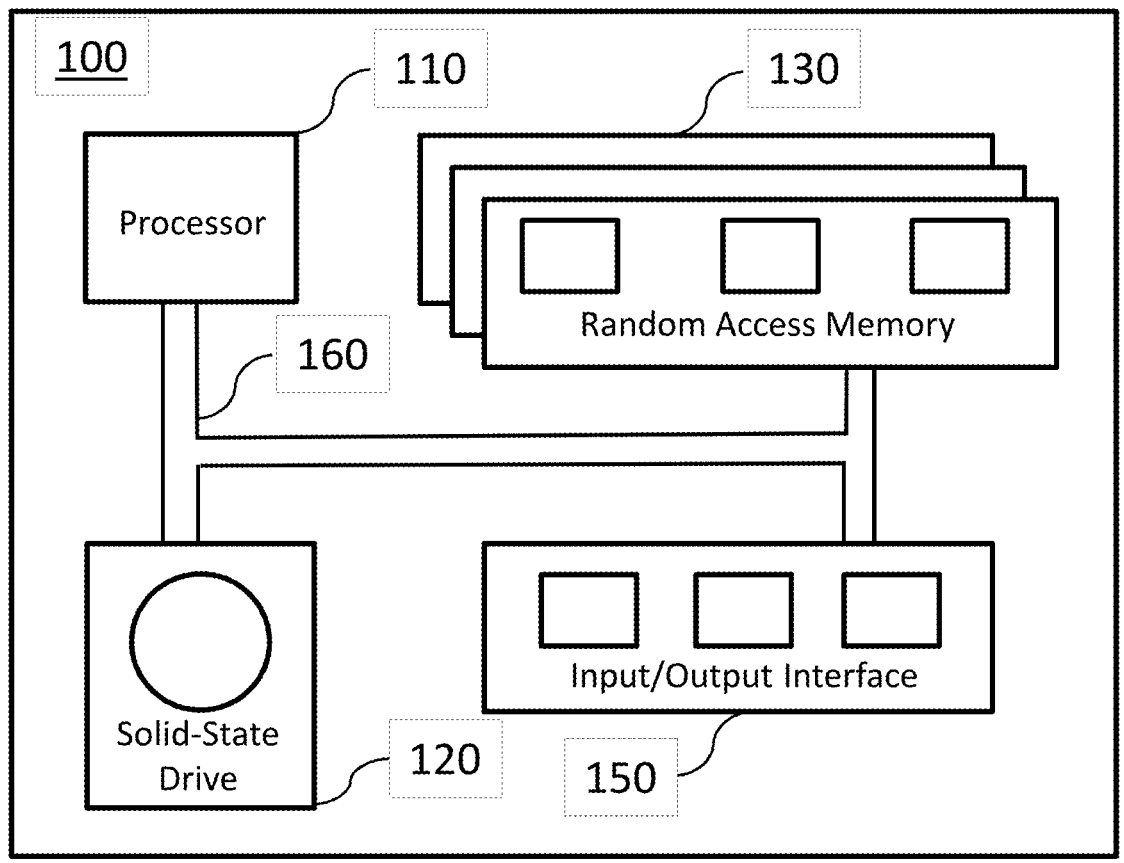
FIG. 1 is a block diagram of an example computing environment in accordance with at least one embodiment of the present technology.

Unless otherwise explicitly specified herein, the drawings ("Figures") are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that one or more modules may include for example, but without being limitative, computer program logic, computer program instructions, software, stack, firmware, hardware circuitry, or a combination thereof which provides the required capabilities.

With these fundamentals in place, we will now consider some non-limiting examples to illustrate various implementations of aspects of the present technology.

FIG. 1 illustrates a computing environment in accordance with an embodiment of the present technology, shown generally as 100. In some embodiments, the computing environment 100 may be implemented by any of a conventional personal computer, a computer dedicated to managing network resources, a network device and/or an electronic device (such as, but not limited to, a mobile device, a tablet device, a server, a controller unit, a control device, etc.), and/or any combination thereof appropriate to the relevant task at hand. In some embodiments, the computing environment 100 comprises various hardware components including one or more single or multi-core processors collectively represented by processor 110, a solid-state drive 120, a random access memory 130, and an input/output interface 150. The computing environment 100 may be a computer specifically designed to detect landmarks and/or match documents. In some alternative embodiments, the computing environment 100 may be a generic computer system.

In some embodiments, the computing environment 100 may also be a subsystem of one of the above-listed systems. In some other embodiments, the computing environment 100 may be an "off-the-shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Those skilled in the art will appreciate that processor 110 is generally representative of a processing capability. In some embodiments, in place of one or more conventional Central Processing Units (CPUs), one or more specialized processing cores may be provided. For example, one or more Graphic Processing Units (GPUs), Tensor Processing Units (TPUs), and/or other so-called accelerated processors (or processing accelerators) may be provided in addition to or in place of one or more CPUs.

System memory will typically include random access memory 130, but is more generally intended to encompass any type of non-transitory system memory such as static random access memory (SRAM), dynamic random access memory (DRAM), synchronous DRAM (SDRAM), read-only memory (ROM), or a combination thereof. Solid-state drive 120 is shown as an example of a mass storage device, but more generally such mass storage may comprise any type of non-transitory storage device configured to store data, programs, and other information, and to make the data, programs, and other information accessible via a system bus 160. For example, mass storage may comprise one or more of a solid state drive, hard disk drive, a magnetic disk drive, and/or an optical disk drive.

Communication between the various components of the computing environment 100 may be enabled by a system bus 160 comprising one or more internal and/or external buses (e.g., a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wire or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi, Token Ring or Serial communication protocols. The specific physical layer and the data link layer may provide a base for a full network protocol stack, allowing communication among small groups of computers on the same local area network (LAN) and large-scale network communications through routable protocols, such as Internet Protocol (IP).

According to some implementations of the present technology, the solid-state drive 120 stores program instructions suitable for being loaded into the random access memory 130 and executed by the processor 110 for executing acts of one or more methods described herein, relating to detecting landmarks and/or matching documents. For example, at least some of the program instructions may be part of a library or an application.

Figure 2:
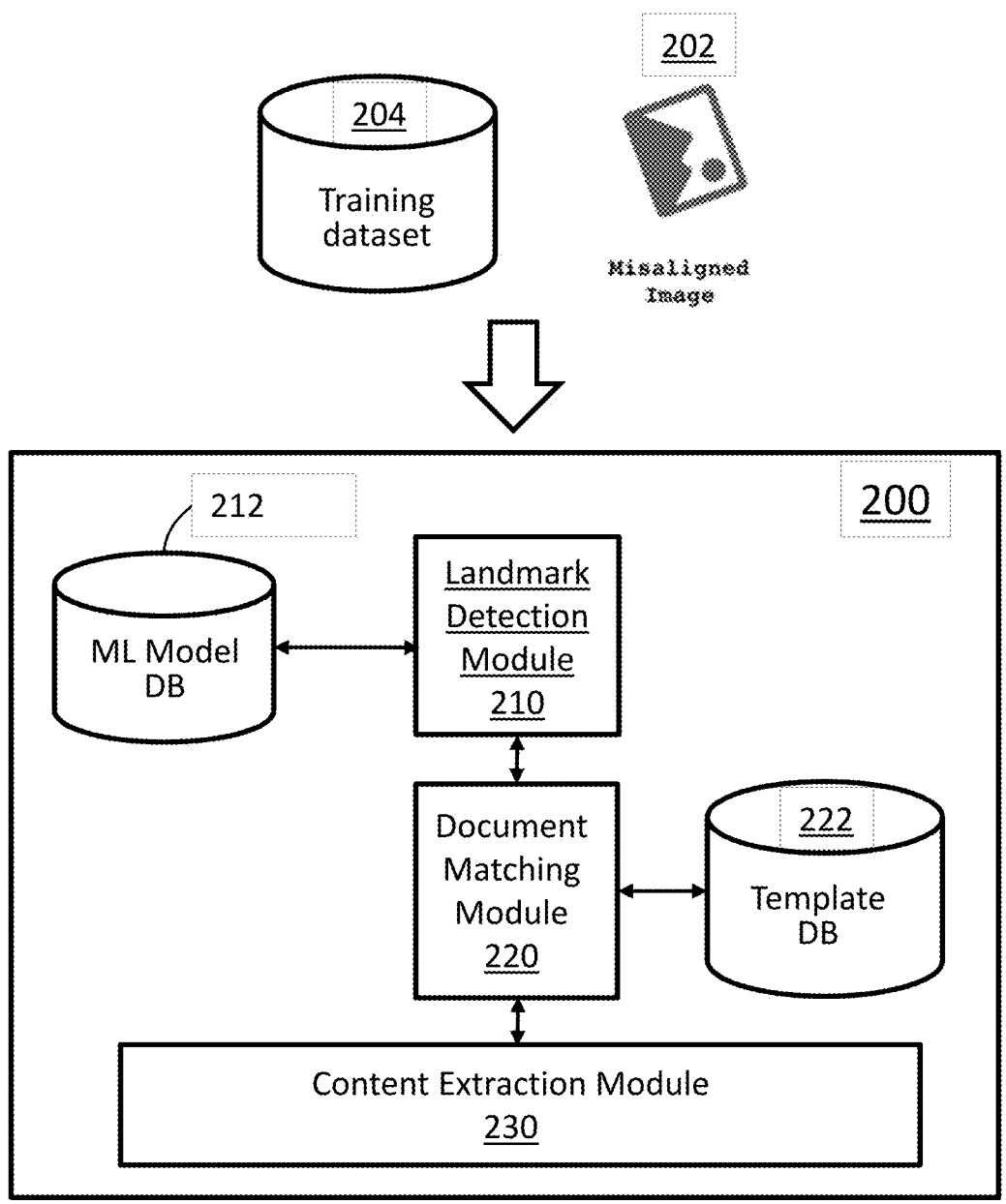
FIG. 2 is a block diagram illustrating a system comprising a landmark detection module and a document matching module in accordance with at least one embodiment of the present technology.

FIG. 2 is a block diagram illustrating a system 200 comprising a landmark detection module, a document matching module 220 and a content extraction module 230. In accordance with some embodiments, the system 200 may receive one or more images 202 for further processing, for example, but without being limitative, further processing involving image registration and/or document matching.

The one or more images 202 may be accessed from a computer-readable memory storing digital representations of images. The digital representations of the images may be stored in a computer-readable format, for example, but without being limitative, under the file formats jpeg, png, tiff and/or gif. The digital representations may be compressed or uncompressed. The digital representations may be in raster formats or vectorial formats. This aspect is non-limitative and multiple variations will become apparent to the person skilled in the art of the present technology. The digital representations may have been generated by a camera, a scanner or any electronic device configured to generate a digital representation of an image. In some embodiments, the image comprises landmarks which may be broadly defined as image features which may be relied upon to define a coordinate system associated with the content of the image. Such coordinate system may be used for multiple machine-vision tasks, such as, but not limited to, image registration.

In accordance with some embodiments of the present technology, the image 202 may comprise a digital representation of a document. The document may be a sheet of paper. In some embodiments, the sheet of paper may be a form which may be filled with additional information. The additional information may have been handwritten on the form or typed in (e.g., a form having been filled electronically and then printed). In some embodiments, the empty form (i.e., prior to any additional information being added to the form) may define a template form. The template form may comprise pre-defined content/fields such as boxes, lines, sections, questions, graphical information, etc. The template form may be organised so as to collect information associated with one or more tasks, such as administrative tasks. As an example, an administrative task may be to collect information in the context of insurance company gathering information from clients or potential clients. In some embodiments, the template form may have been downloaded from a website by a user, printed, filled out and scanned thereby generating a digital representation of the document (in this example, a filled out form). In such example, landmarks associated with the document may comprise corners which exact positions in the digital representation vary depending on how the document was positioned during the scanning process. This typically results in positions of corners of a same document varying from one scanned version of the document to another. Such situation may be referred to as a misaligned document or misaligned image. In other embodiments, landmarks associated with the document may also comprise edges which exact positions in the digital representation may also vary depending on how the document was positioned during the scanning process.

In accordance with some aspects of the present technology, a first technical problem to be addressed involve accurately identifying positions of landmarks (typically four corners/edges but variations may encompass less than four corners/edges of more than four corners/edges) of a document from a digital representation of the document (in this example the scanned document). Embodiments of the present technology provide improved performances for accurately identifying positions of landmarks from an image. Such embodiments may be implemented through a landmark detection module such as the landmark detection module 210.

Broadly speaking, the landmark detection module 210 allows automatic and accurate identification of landmarks contained in an image, for example, but without being limitative, corners of a scanned document.

Figure 3:
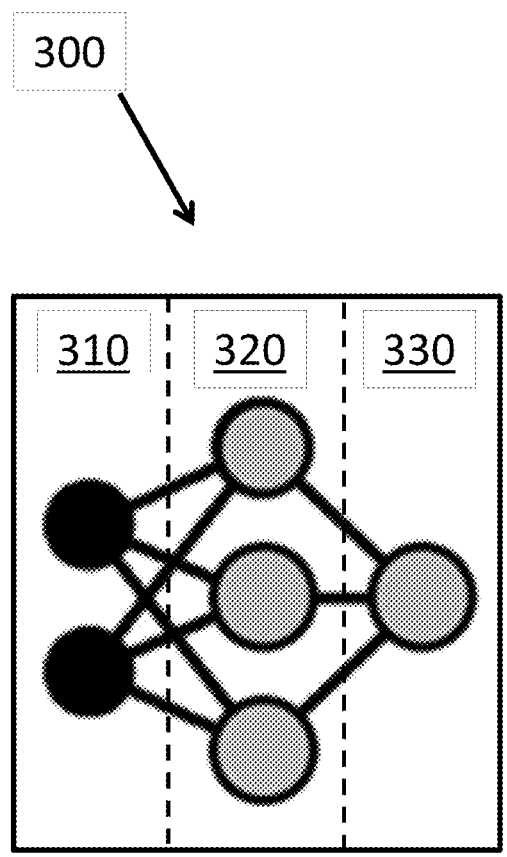
FIG. 3 is a diagram illustrating a neural network in accordance with at least one embodiment of the present technology.

Referring simultaneously to FIGS. 2 and 3, the landmark detection module 210, in some embodiments, implements one or more machine learning algorithms (MLAs). In some embodiments, the one or more MLAs rely on deep learning approaches. In the example illustrated at FIG. 3, the one or more MLAs comprise a neural network, such as a convolutional neural network (CNN) 300 comprising multiple layers 310, 320 and 330. The CNN may rely on training datasets, such as the training dataset 204, to be trained so as to detect landmarks (e.g., corners or edges) of an image inputted to the system 200 (e.g., the image 202). In some embodiments, the training dataset 204 comprises a set of training digital representations of documents associated with labels. The labels may comprise coordinates of landmarks associated with a given documents (e.g., coordinates of corners). In some embodiments, the training dataset 204 may also comprise pixel-wise landmarks heat map which may, for example, be transformed from the coordinates of landmarks. In some embodiments, the training dataset 204 may be relied upon to generate one or more machine learning (ML) models which may be stored in the ML model database 212 and called upon depending on certain use cases. For example, a first ML model may be associated with the detection of corners of forms while a second ML model may be associated with the detection of landmarks from panoramic pictures.

As previously mentioned, the ML model may implement a pre-trained CNN. One example of such CNN is Res-Net-18 which is a CNN trained on more than a million images from the ImageNet database. In accordance with embodiments of the present technology, the pre-trained CNN may be subjected to complementary training, the complementary training being directed to detection of specific landmarks, such as corners of a document.

Referring back to the CNN 300 of FIG. 3, multiple groups of layers 310-330 may implement different learning functions, such as, for example, a first function allowing detection of landmarks of documents represented by digital representations and a second function allowing generation of fractional pixel coordinates for the landmarks detected by the first function. In some embodiments, the first function is configured to down sample the digital representation of the document (i.e., lower the resolution) and, for each pixel of the digital representation of the document, classifies the pixel as a landmark (e.g., a corner, an edge) or not a landmark (e.g., not a corner, not an edge). In some embodiments, the first function may be referred to as a classification task predicting whether a sub-portion of the digital representation of the document comprises a landmark. In some embodiments the second function may be referred to as a regression task generating fractional pixel coordinates from the sub-portion of the digital representation identified as comprising a landmark. In some embodiments, the first function may be described as classifying pixels as landmarks while the second function may be described as predicting offset to improve precision.

In accordance with some aspects of the present technology, the CNN 300 is trained based on a set of training digital representations of documents associated with labels, the labels identifying landmarks (e.g., corners) of the documents represented by the training digital representations. The training of the CNN 300 allows the learning of the first function and the second function. Once training of the CNN 300 is deemed sufficient (e.g., based on a loss function assessing accuracy of classifications/predictions made by the CNN 300), the CNN 300 may be operated by the landmark detection module 210. During operation, the CNN 300 will receive as an input an image for which landmarks (e.g., corners) need to be detected. While processing of the image progresses through the CNN 300, the CNN 300 will down-sample the image (i.e., a resolution of the image will decrease as it is processed through the CNN). However, while the CNN 300 operates detection of landmarks from the down sampled image, the CNN also operates the calculation of fractional pixel coordinates for the detected landmarks. In some embodiments, the fractional pixel coordinates is calculated using original landmark labels and a down sample factor used by the first function. For example, if a landmark is on pixel x=302, y=314, and the down sample factor is 10, then the fractional pixel values are ($2/10$, $4/10$), the fractional labels are then used as labels to train the second function. In other words, given a coordinate x and a down sample factor w, the fractional pixel coordinate is equal to x/w-floor (x/w).

In some embodiments, the fractional pixel coordinates comprises floating values with sufficient accuracy and may be relied upon for reconstructing precise pixel coordinates in the original resolution of the image. In some embodiments, precise pixel coordinates may be defined as the position of the exact pixel at which the landmark is positioned. In some other embodiments, the precise pixel coordinates may be defined as the position of the landmark with about 2-5 pixels of precision. In yet some other embodiments, the precise pixel coordinates may be defined as the position of the landmark with about 5-10 pixels of precision. In some embodiments, the first function and the second function are executed in parallel so that the fractional pixel coordinates may be calculated while the first function identifies landmarks on the lower resolution image. As a result, once the landmarks are identified at the lower resolution and associated fractional pixel coordinates are calculated, the landmark detection module 210 may reconstruct the pixel coordinates of the landmarks in the original image based on the fractional pixel coordinates. As an example, the original resolution of an image may be 10 000*10 000. The first function identifies landmarks at a resolution of 100*100 while the second function calculates the fractional pixel coordinates of the identified landmark (e.g. a corner) as x=0.6 and y=0.3. Based on the output of the first function and the second function, the landmark detection module 210 may upscale the pixel coordinates so as to determine that the pixel coordinates of the landmark in the original resolution are x=1 065 and y=523.

As detailed above, the landmark detection module 210 may output pixel coordinates of landmarks associated with an image. In the context of the system 200, the landmark detection module 210 may provide the determined pixel coordinates to the document matching module 220. In the specific context of identifying corners of a document from its digital representation, the landmark detection module 210 may generate a set of coordinates associated with corners of the documents (e.g., a first set of coordinates of a top left corner, a second set of coordinates of a top right corner, a third set of coordinates of a bottom left corner and a fourth set of coordinates of a top right corner). In some embodiments, the CNN 300 outputs four images, each one of the four images representing a distinct identified corner, and four sets of associated coordinates.

In some embodiments, the document matching module 220 relies on the set of coordinates associated with corners of the document to align the document with reference documents such a document templates. As an example, the system 200 may be operated in the context of identifying which template form amongst a plurality of template forms correspond to the document of the digital representation. In some embodiments, the template forms (also referred to as reference documents) are stored in the template database 222.

Figure 4:
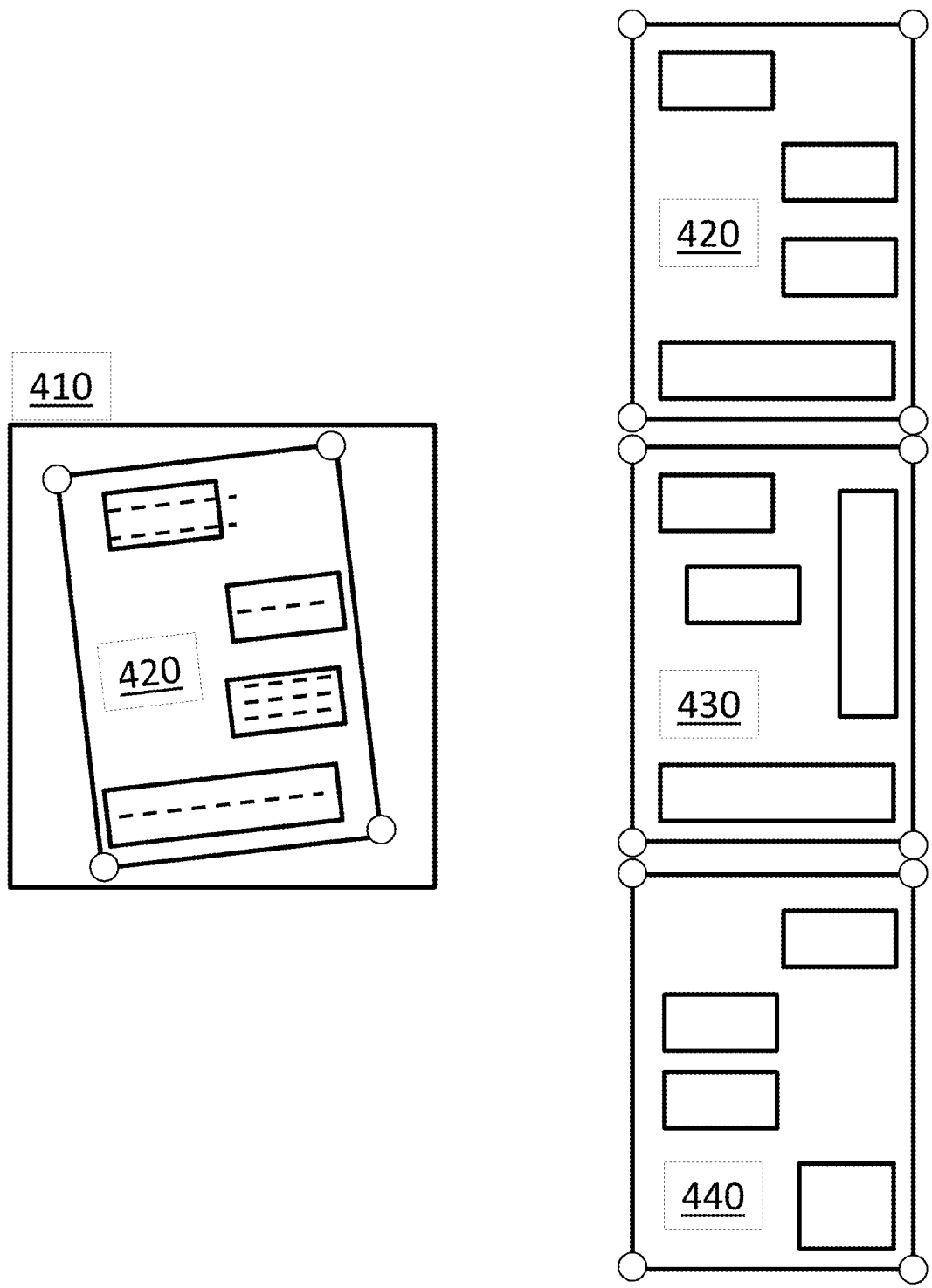
FIGS. 4 and 5 illustrate examples of document matching in accordance with at least one embodiment of the present technology.
Figure 5:
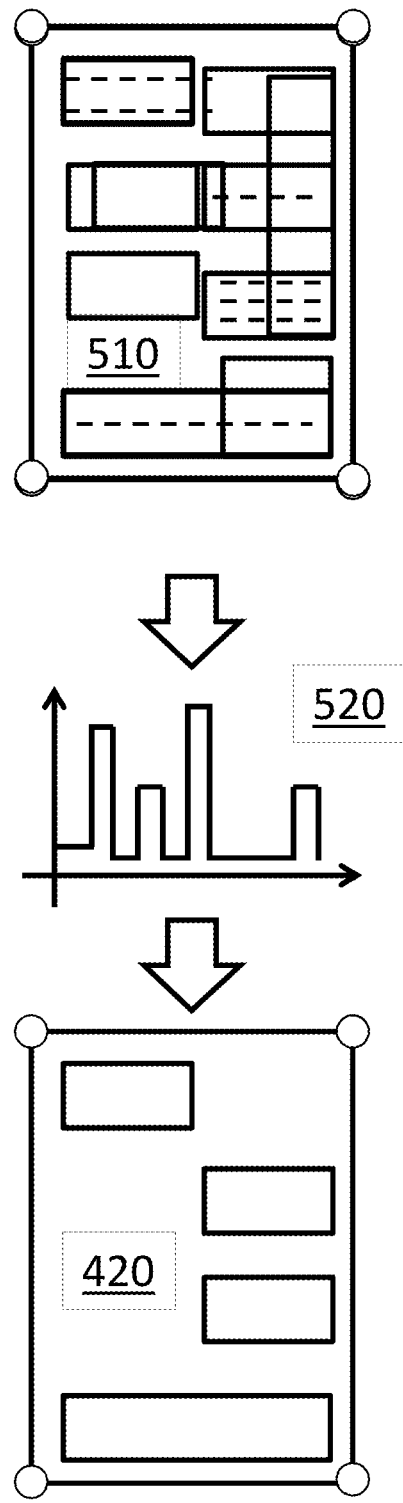

FIG. 4 illustrates an example of a digital representation 410 of a form 420 and reference template forms 420-440. The digital representation 410 comprises boxes filled out with information. For each one of the reference template forms 420-440, corners have been identified or associated upon creation of the template database 222. Corners of the document represented in the digital representation 410 have been determined by the landmark detection module 210. Once corners of the document and corners of the reference template forms 420-440 are known, the document matching module 220 may undertake to align the document with respect to the reference template forms 420-440. In some embodiments, the alignment is operated by an image alignment routine which comprises determining a transformation based on the pixel coordinates of the corners of the document and known corners of the reference template documents. In some embodiments, the transformation allows mapping the document onto the reference template documents as illustrated at FIG. 5 (see 510 representing document and template forms 420-440 aligned). In some embodiments, the transformation comprises an affine transformation and/or a homographic transformation (e.g., implemented by computing an homography matrix). Implementations details of the transformation such as the affine transformation and/or homographic transformation will become apparent to the person skilled in the art of the present technology. Other transformations may also be used without departing from the scope of the present technology.

Once the document and reference template forms 420-440 are aligned, the document matching module 220 proceeds to calculating a covariance of pixel values of the document aligned and superimposed to reference template forms 420-440 as exemplified by the graphic representation 520. In some embodiments, operating the document matching module 220 entails comparing the pixels values of the document and a given reference template form, the document being aligned with the given reference template form. Two one-dimensional vectors of length (width*height) are generated, a first one-dimensional vector being associated with the aligned document and a second one-dimensional vector being associated with the given reference template form with which the document is aligned. If the document and the given reference template form are well aligned, pixels should move from dark to light in a similar way in the aligned document compared to the given reference template form. If the document corresponds to the given reference template form then the first one-dimensional vector substantially matches the second one-dimensional vector. If the document does not correspond to the given reference template form then the first one-dimensional vector does not match the second one-dimensional vector. In some embodiments, a calculation of a correlation between the first one-dimensional vector and the second one-dimensional vector allows determining if a substantial match exists or not.

In some embodiments, the covariance of pixels values allows identification of picks reflective of a match between a portion of the document and a corresponding reference template form. For example, a box located at a same position in both the document and a corresponding reference template form will result in a pick of the covariance value for the pixels representing the box. As a result, a high covariance will indicate that the reference template form is more likely to correspond to the document. As a result, in some embodiments, the document matching module 220 may rely on the higher covariance to determine which reference template form amongst a plurality of reference template forms is likely to correspond to the document. Once that determination is completed, the document matching module 220 may output an indication of the reference template form corresponding to the document, in the example of FIG. 5, the template form 420.

Referring back to FIG. 2, once the document matching module 220 has identified which reference template form corresponds to the document, the content extraction module 230 may proceed to an extraction of the content of the document. As the system 200 knows which reference template form corresponds to the document, the extracted content may be associated with the corresponding known fields of the reference template form. For example, content located within a field "first name" may be extracted as a corresponding content for the field "first name".

Figure 6:
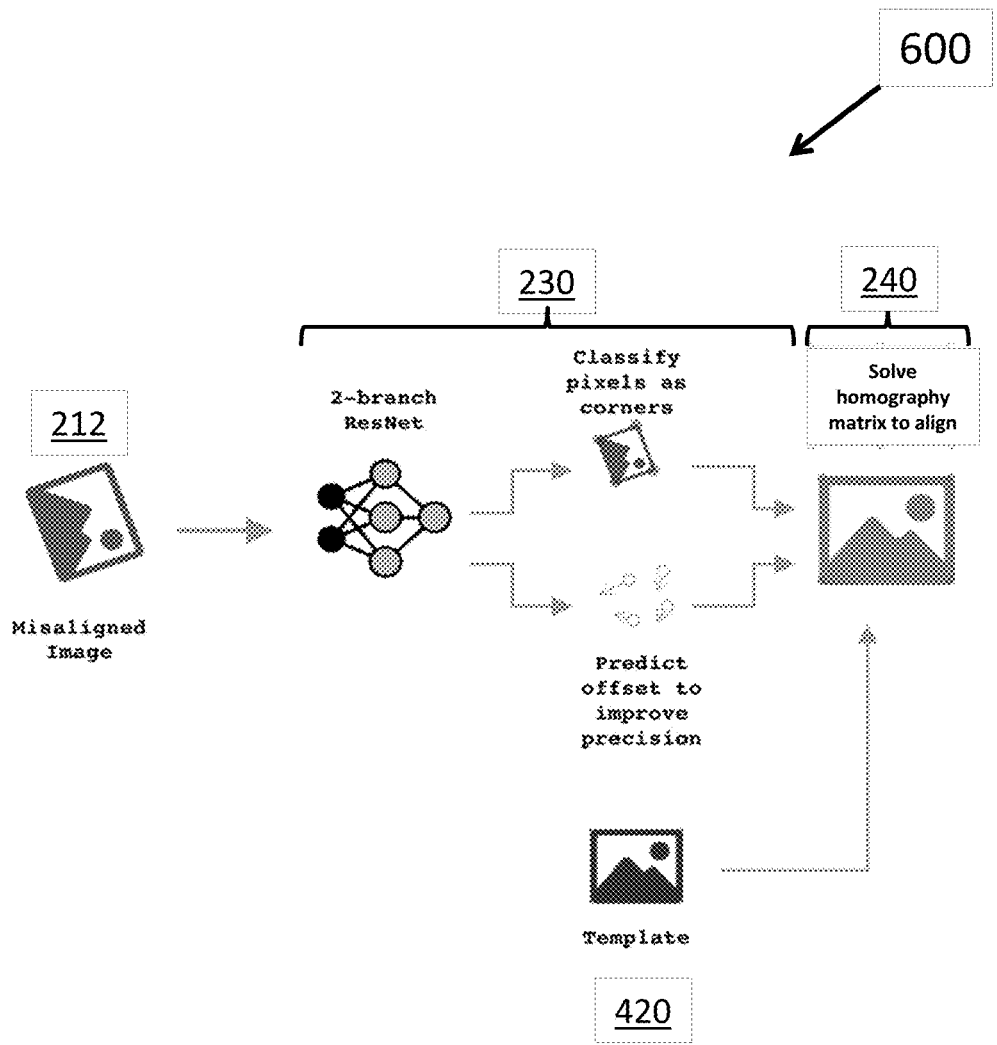
FIG. 6 is a diagram providing an overview of a method of conducting document matching based on identified landmarks in accordance with at least one embodiment of the present technology.

Turning now to FIG. 6, a diagram providing an overview of a method of conducting document matching based on identified landmarks 600 is illustrated. The method 600 may be executed by the system 200, in particular by the landmark detection module 210 and the document matching module 220 which takes as an input the image 212 and outputs a corresponding form template 420.

Figure 7:
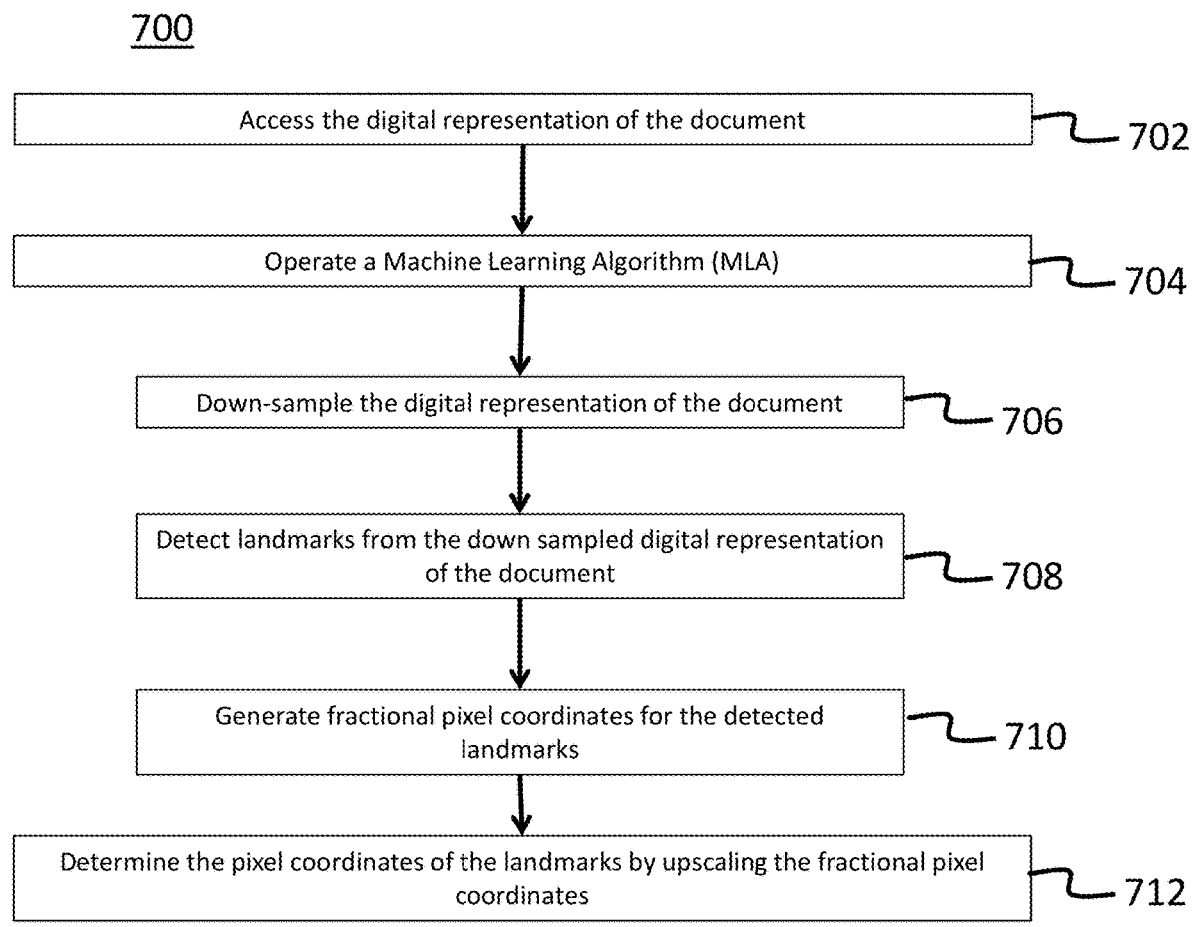
FIG. 7 is a flow diagram illustrating steps of a computer-implemented method of identifying landmarks of a document from a digital representation of the document in accordance with at least one embodiment of the present technology.

Referring now to FIG. 7, some non-limiting example instances of systems and computer-implemented methods for identifying landmarks of a document from a digital representation of the document are detailed. More specifically, FIG. 7 shows a flowchart illustrating a computer-implemented method 700 implementing embodiments of the present technology. The computer-implemented method of FIG. 7 may comprise a computer-implemented method executable by a processor of a computing environment, such as the computing environment 100 of FIG. 1, the method comprising a series of steps to be carried out by the computing environment.

Certain aspects of FIG. 7 may have been previously described with references to FIG. 2-6. The reader is directed to that disclosure for additional details.

The method 700 starts at step 702 by accessing the digital representation of the document, the digital representation being associated with a first resolution. The method 700 then proceeds to step 704 by operating a Machine Learning Algorithm (MLA). The MLA having been previously trained to learn a first function allowing detection of landmarks of documents represented by digital representations and to learn a second function allowing generation of fractional pixel coordinates for the landmarks detected by the first function. In some embodiments, the MLA is trained based on a set of training digital representations of documents associated with labels, the labels identifying landmarks of the documents represented by the training digital representations. In some embodiments, operating the MLA comprises steps 706-710.

Step 706 comprises down-sampling the digital representation of the document, the down-sampled digital representation of the document being associated with a second resolution, the second resolution being lower than the first resolution. Step 708 comprises detecting landmarks from the down sampled digital representation of the document. Step 710 comprises generating fractional pixel coordinates for the detected landmarks in accordance with the second resolution, the fractional pixel coordinates allowing reconstructing pixel coordinates in accordance with the first resolution.

At further step 712, the method 700 comprises determining the pixel coordinates of the landmarks by upscaling the fractional pixel coordinates from the second resolution to the first resolution which in turn may be outputted.

In some embodiments, the MLA comprises a Convolutional Neural Network (CNN) comprising multiple layers, the multiple layers comprising a first layer implementing the learning of the first function and a second layer implementing the learning of the second function. In some embodiments, the labels identifying landmarks comprise coordinates. In some embodiments, the fractional pixel coordinates comprise floating values. In some embodiments, the first function implements a classification task, the classification task predicting whether a sub-portion of the digital representation of the document comprises a landmark. In some embodiments, the second function implements a regression task, the regression task generating fractional pixel coordinates from the sub-portion of the digital representation identified as comprising a landmark. In some embodiments, the landmarks comprise corners or edges.

Figure 8:
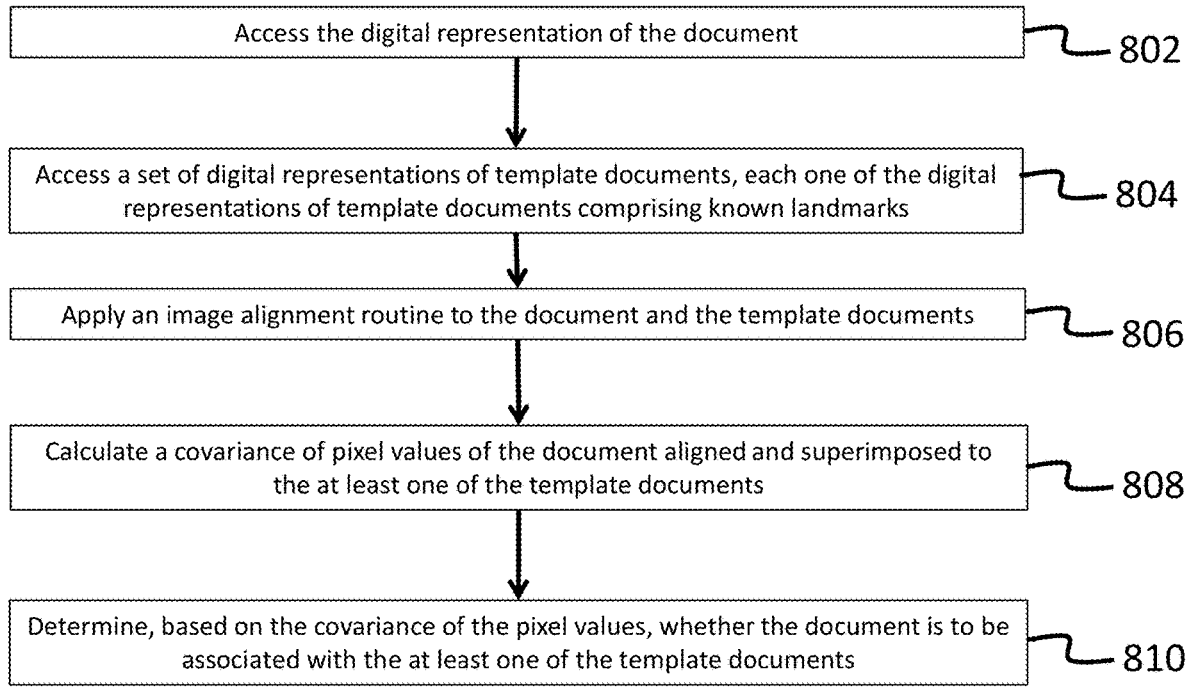
FIG. 8 is a flow diagram illustrating steps of identifying a template document to be associated with a document in accordance with at least one embodiment of the present technology.

Referring now to FIG. 8, some non-limiting example instances of systems and computer-implemented methods for identifying a template document to be associated with a document are detailed. More specifically, FIG. 8 shows a flowchart illustrating a computer-implemented method 800 implementing embodiments of the present technology. The computer-implemented method of FIG. 8 may comprise a computer-implemented method executable by a processor of a computing environment, such as the computing environment 100 of FIG. 1, the method comprising a series of steps to be carried out by the computing environment.

Certain aspects of FIG. 8 may have been previously described with references to FIG. 2-6. The reader is directed to that disclosure for additional details.

The method 800 starts at step 802 by accessing the digital representation of the document. Then, at step 804, the method proceeds to accessing a set of digital representations of template documents, each one of the digital representations of template documents comprising known landmarks. At a step 806, the method proceeds to applying an image alignment routine to the document and the template documents. At a step 808, the method proceeds to calculating a covariance of pixel values of the document aligned and superimposed to the at least one of the template documents. Then, at a step 810, the method proceeds to determining, based on the covariance of the pixel values, whether the document is to be associated with the at least one of the template documents.

In some embodiments, the image alignment routine comprises the steps of (i) determining pixel coordinates of landmarks of the document; and (ii) determining a transformation based on the determined pixel coordinates of the landmarks of the document and known landmarks of at least one of the template documents, the transformation allowing mapping the document onto the at least one of the template documents. In some embodiments, the transformation comprises one of an affine transformation and a homographic transformation. In some embodiments, the digital representation being associated with a first resolution and determining the pixel coordinates of landmarks of the document comprises executing the method 700. In some embodiments, the document is a form comprising filled content and the template documents comprise template forms, each one of the template forms comprising a plurality of fields. In some embodiments, the method 800 further comprises associating the filled content of the form with corresponding fields of the at least one of the template forms. In some embodiments, the landmarks comprise corners or edges.

Figure 9:
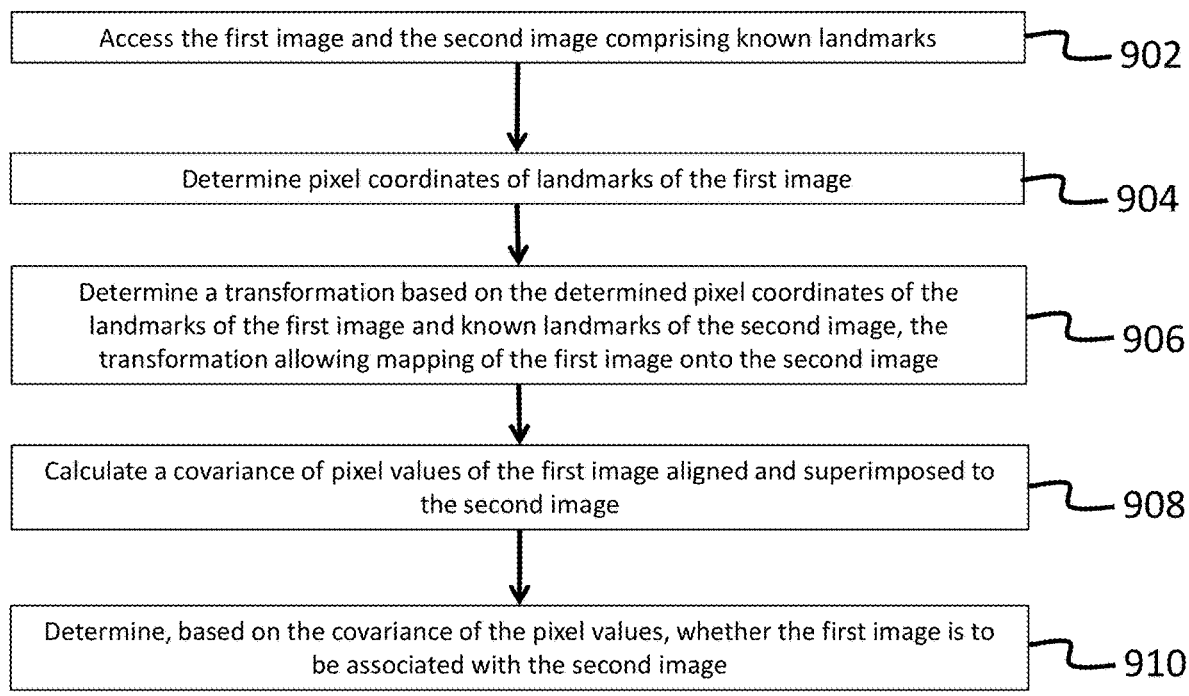
FIG. 9 is a flow diagram illustrating steps of aligning a first image with a second image in accordance with at least one embodiment of the present technology.

Referring now to FIG. 9, some non-limiting example instances of systems and computer-implemented methods for aligning a first image with a second image are detailed. More specifically, FIG. 9 shows a flowchart illustrating a computer-implemented method 900 implementing embodiments of the present technology. The computer-implemented method of FIG. 9 may comprise a computer-implemented method executable by a processor of a computing environment, such as the computing environment 100 of FIG. 1, the method comprising a series of steps to be carried out by the computing environment.

Certain aspects of FIG. 9 may have been previously described with references to FIG. 2-6. The reader is directed to that disclosure for additional details.

The method 900 starts at step 902 by accessing the first image and the second image comprising known landmarks. Then, at step 904, the method 900 proceeds to determining pixel coordinates of landmarks of the first image. At a step 906, the method 900 proceeds to determining a transformation based on the determined pixel coordinates of the landmarks of the first image and known landmarks of the second image, the transformation allowing mapping of the first image onto the second image. At a step 908, the method 900 proceeds to calculating a covariance of pixel values of the first image aligned and superimposed to the second image. Then, at a step 910, the method 900 proceeds to determining, based on the covariance of the pixel values, whether the first image is to be associated with the second image. In some embodiments, the first image is associated with a first resolution and determining the pixel coordinates of landmarks of the first image comprises executing the method 700. In some embodiments, the landmarks comprise corners or edges.

While some of the above-described implementations may have been described and shown with reference to particular acts performed in a particular order, it will be understood that these acts may be combined, sub-divided, or re-ordered without departing from the teachings of the present technology. At least some of the acts may be executed in parallel or in series. Accordingly, the order and grouping of the act is not a limitation of the present technology.

It should be expressly understood that not all technical effects mentioned herein need be enjoyed in each and every embodiment of the present technology.

As used herein, the wording "and/or" is intended to represent an inclusive-or; for example, "X and/or Y" is intended to mean X or Y or both. As a further example, "X, Y, and/or Z" is intended to mean X or Y or Z or any combination thereof.

The foregoing description is intended to be exemplary rather than limiting. Modifications and improvements to the above-described implementations of the present technology may be apparent to those skilled in the art.

What is claimed is:

1. A computer-implemented method of identifying landmarks of a document from a digital representation of the document, the method comprising:
   accessing the digital representation of the document, the digital representation being associated with a first resolution;
   operating a Machine Learning Algorithm (MLA), the MLA having been trained:
   based on a set of training digital representations of documents associated with labels, the labels identifying landmarks of the documents represented by the training digital representations;
   to learn a first function allowing detection of landmarks of documents represented by digital representations;
   to learn a second function allowing generation of fractional pixel coordinates for the landmarks detected by the first function;
      the operating the MLA comprising:
   down-sampling the digital representation of the document, the down-sampled digital representation of the document being associated with a second resolution, the second resolution being lower than the first resolution;
   detecting landmarks from the down sampled digital representation of the document;
   generating fractional pixel coordinates for the detected landmarks in accordance with the second resolution, the fractional pixel coordinates allowing reconstructing pixel coordinates in accordance with the first resolution;
   determining the pixel coordinates of the landmarks by upscaling the fractional pixel coordinates from the second resolution to the first resolution; and
   outputting the pixel coordinates of the landmarks.

2. The method of claim 1, wherein the MLA comprises a Convolutional Neural Network (CNN) comprising multiple layers, the multiple layers comprising a first layer implementing the learning of the first function and a second layer implementing the learning of the second function.

3. The method of claim 1, wherein the labels identifying landmarks comprise coordinates.

4. The method of claim 1, wherein the fractional pixel coordinates comprise floating values.

5. The method of claim 1, wherein the first function implements a classification task, the classification task predicting whether a sub-portion of the digital representation of the document comprises a landmark.

6. The method of claim 5, wherein the second function implements a regression task, the regression task generating fractional pixel coordinates from the sub-portion of the digital representation identified as comprising a landmark.

7. The method of claim 1, wherein the landmarks comprise one of corners or edges.

8. A system for identifying landmarks of a document from a digital representation of the document, the system comprising:
   at least one processor, and
   memory storing a plurality of executable instructions which, when executed by the at least one processor, cause the system to:
   access the digital representation of the document, the digital representation being associated with a first resolution;
   operate a Machine Learning Algorithm (MLA), the MLA having been trained:
      based on a set of training digital representations of documents associated with labels, the labels identifying landmarks of the documents represented by the training digital representations;
      to learn a first function allowing detection of landmarks of documents represented by digital representations;
      to learn a second function allowing generation of fractional pixel coordinates for the landmarks detected by the first function;
   the operating the MLA comprising:
      down-sampling the digital representation of the document, the down-sampled digital representation of the document being associated with a second resolution, the second resolution being lower than the first resolution;
      detecting landmarks from the down sampled digital representation of the document;
      generating fractional pixel coordinates for the detected landmarks in accordance with the second resolution, the fractional pixel coordinates allowing reconstructing pixel coordinates in accordance with the first resolution;
      determining the pixel coordinates of the landmarks by upscaling the fractional pixel coordinates from the second resolution to the first resolution; and
      outputting the pixel coordinates of the landmarks.

9. The system of claim 8, wherein the MLA comprises a Convolutional Neural Network (CNN) comprising multiple layers, the multiple layers comprising a first layer implementing the learning of the first function and a second layer implementing the learning of the second function.

10. The system of claim 8, wherein the labels identifying landmarks comprise coordinates.

11. The system of claim 8, wherein the fractional pixel coordinates comprise floating values.

12. The system of claim 8, wherein the first function implements a classification task, the classification task predicting whether a sub-portion of the digital representation of the document comprises a landmark.

13. The system of claim 12, wherein the second function implements a regression task, the regression task generating fractional pixel coordinates from the sub-portion of the digital representation identified as comprising a landmark.

14. The system of claim 8, wherein the landmarks comprise one of corners or edges.

* * * * *